United States Patent
Middleton

[19]

[11] Patent Number: 5,860,102
[45] Date of Patent: Jan. 12, 1999

[54] CACHE MEMORY CIRCUIT

[75] Inventor: Peter Guy Middleton, West Wickham, United Kingdom

[73] Assignee: Advanced Risc Machines Limited, Cherry Hinton, United Kingdom

[21] Appl. No.: 715,563

[22] Filed: Sep. 18, 1996

[30] Foreign Application Priority Data

Jan. 5, 1996 [GB] United Kingdom .................. 9600176

[51] Int. Cl.$^6$ .................................................. G06F 12/00
[52] U.S. Cl. ........................ 711/133; 711/155; 711/159; 711/134
[58] Field of Search .................................. 365/49, 189.04, 365/221, 189.01; 395/872, 403, 449, 492, 511; 711/3, 122, 165, 133

[56] References Cited

U.S. PATENT DOCUMENTS

| | | | |
|---|---|---|---|
| 4,317,168 | 2/1982 | Messina et al. .......................... | 364/200 |
| 4,872,138 | 10/1989 | Ciacci ........................................ | 365/49 |
| 5,309,395 | 5/1994 | Dickinson et al. ................. | 365/189.04 |
| 5,337,414 | 8/1994 | Hashemi et al. .......................... | 395/872 |
| 5,379,379 | 1/1995 | Becker et al. ............................ | 395/403 |
| 5,526,508 | 6/1996 | Park et al. ............................... | 395/449 |
| 5,551,009 | 8/1996 | Amini et al. ............................. | 395/492 |
| 5,559,952 | 9/1996 | Fujimoto .................................. | 395/511 |
| 5,596,521 | 1/1997 | Tanaka et al. ............................. | 365/49 |
| 5,596,540 | 1/1997 | Diem et al. .............................. | 365/221 |
| 5,602,780 | 2/1997 | Diem et al. ......................... | 365/189.01 |

*Primary Examiner*—Tod R. Swann
*Assistant Examiner*—Fred F. Tzeng
*Attorney, Agent, or Firm*—Fenwick & West LLP

[57] ABSTRACT

A cache memory circuit 36 is described which has a separate read bus 90 and write bus 98. When a given cache row is selected, then simultaneous read and write operations can take place to different words (W#0, W#1, W#2, W#3) within the cache row using the read bus and the write bus. The cache memory circuit 38 having this configuration is particularly suited for use as a write back cache. When a cache miss occurs causing the need for a cache row to be replaced, then the words are replaced starting with the word to which an attempted access triggered the cache miss and proceeding in ascending address order.

10 Claims, 8 Drawing Sheets

Save W#0 to
Write Buffer

Save W#1 to
Write Buffer

Save W#2 to
Write Buffer

Save W#3 to
Write Buffer

Read new W#0 and
save in cache

Read new W#1 and
save in cache

Read new W#2 and
save in cache

Read new W#3 and
save in cache

CACHE MEMORY CIRCUIT

BACKGROUND OF THE INVENTION

1. Field of the Invention

This invention relates to the field of data processing. More particularly, this invention relates to cache memory circuits of the type that are typically used to provide short term, high speed storage for instruction words or data words.

2. Description of the Prior Art

FIG. 1 of the accompanying drawings illustrates a data processing system utilizing a cache memory circuit. An integrated circuit 2 is formed bearing a central processing unit core 4, a cache memory circuit 6 and a write buffer 8 among other components. The integrated circuit 2 is coupled to a random access memory 10 that provides the bulk of the storage capacity for the system.

In operation, when required by the central processing unit core 4, words representing instructions or data to be manipulated are read from the random access memory 10 and stored in the cache memory circuit 6. Subsequently, when the central processing unit core 4 needs to access one of these words, it first checks to see if it is present in the cache memory circuit 6. If the word is so present, then it may be accessed at high speed from this on-chip cache memory circuit 6 without having to make recourse to a slower off-chip access to the random access memory 10. There are various strategies for selecting which words should be held within the cache memory circuit 6 and how consistency should be maintained between the words stored within the cache memory circuit 6 (that may be subject to manipulation) and the corresponding words stored within the random access memory 10. With one strategy for maintaining consistency, the cache memory circuit is configured as a so called "write back cache".

In operation of such an arrangement, when the central processing unit core 4 wishes to access a particular word, a check is made within the cache memory circuit 6 to determine whether this word is stored there. If the word is stored in the cache memory circuit 6, then a cache hit has occurred. Following a cache hit, a high speed read or write operation to that word may be made. It is significant that if a write operation is made to the word, then this write operation is not at this stage made to the corresponding word stored within the random access memory 10. Accordingly, the instance of that word stored within the random access memory 10 becomes out of date and invalid.

The updating of out of date words within the random access memory 10 occurs when the corresponding words within the cache memory circuit 6 are being replaced to make way for other words to which it is more desirable to have high speed access. When words stored within the cache memory circuit 6 are so replaced, then they are written back to the random access memory 10 so updating the instances of the words stored within the random access memory 10. FIG. 2 of the accompanying drawings illustrates this process in more detail.

At step 12, when a cache miss occurs, then the write back process is entered. The first stage is to identify the cache row to be replaced at step 14. Various strategies may be employed to determine which cache row (a cache is typically organised in rows, each cache row storing a plurality of words) is to be replaced. A common strategy is to replace the cache row that was least recently accessed (used).

A so called "dirty flag" for the cache row indicates whether any of the words stored therein have been changed since they were read from the random access memory 10. If the dirty flag is set, then at steps 16 to 22 the four words currently stored within the selected cache row are written to the write buffer 8 during successive clock cycles (fclk) of the integrated circuit 2. The example of FIG. 2 assumes that such a change has occurred.

Once the old words have been safely written to the write buffer 8 for subsequent storage back to the random access memory 10, the clock signal of the integrated circuit 2 is synchronised to the external, slower memory clock signal (mclk) that drives the random access memory 10 at step 24. This switch of clock signals could be made earlier, but this would slow down the overall operation as it is best to keep using the faster clock signal (fclk) for as long as possible.

In steps 26, 28, 30 and 32 the new words from the random access memory 10 are read into the cache row on successive external clock cycles.

It will be seen from FIG. 2 that the writing back of the old words and the reading in of the new words takes in excess of (4×fclk)+(4×mclk). The writing back and reading in of the words of a cache row is controlled by cache control logic 34 within the cache memory circuit 6. This example assumes a different and faster fclk signal from the mclk signal. These signals could be the same.

FIG. 3 of the accompanying drawings illustrates the process shown in FIG. 2. The top four schematics illustrate the saving of successive words from the selected cache row to the write buffer. The bottom four illustrations illustrate the subsequent reading of four successive words from the random access memory 10.

The performance of a cache has a large impact upon the overall performance of a data processing system within which the cache is incorporated. Measures which improve the performance of a cache (e.g. its speed of operation) are highly advantageous.

SUMMARY OF THE INVENTION

Viewed from one aspect the present invention provides a cache memory circuit comprising:

(i) a plurality of cache rows, each cache row storing a plurality of words;

(ii) a read bus coupled to said plurality of cache rows for reading words from said cache memory circuit;

(iii) a write bus coupled to said plurality of cache rows for writing words to said cache memory circuit;

(iv) a row selector for selecting one of said plurality of cache rows as an active cache row;

(v) a read multiplexer for selecting a first word from said active cache row to generate an output word to a read bus;

(vi) a write multiplexer for selecting a second word from said active cache row to receive an input word from a write bus, said second word being different from said first word; and (vii) a multiplexer controller for controlling said read multiplexer and said write multiplexer such that said first word from said active row may be read via said read bus at the same time as said second word from said active row is written via said write bus.

The invention provides a cache memory circuit in which the speed with which a cache row can be replaced is increased due to the provision of a separate read bus and a separate write bus appropriately multiplexed to words within a cache row. In this way, in a given processing cycle, both a read operation and a write operation may be made to a different word within a cache row. Thus, the speed of operation of the cache may be improved.

A cache memory circuit with a separate read bus and write bus may be advantageously used in various configurations. However, the invention is particularly suited to embodiments in which said cache memory circuit includes cache control logic that operates said cache memory circuit as a write back cache to a main memory.

When operating as a write back cache, a plurality of write operations and a plurality of read operations must be performed when it is desired to replace the contents of a cache row. The ability to perform such operations at least partially in parallel reduces the overall time taken to replace the contents of a cache row and so improves cache performance.

The manner in which the replacement of the contents of a cache row may be triggered can vary. However, the invention is particularly useful in embodiments in which when a cache miss occurs for an access to a specified word, this triggers a plurality of old words stored within a cache row to be replaced with a plurality of new words from said main memory including said specified word.

In such situations the specified word is required by the rest of the system as soon as possible and yet sufficient time must be allowed to correctly save the existing contents of the cache row before they are replaced by words including the specified word.

In preferred embodiments of the invention, in a first step following said cache miss, said old word stored within said cache row that will be replaced with said specified word is read from said cache row via said read bus for storing to said main memory.

The order in which the old words within a cache row are saved before replacement could follow any course, however, it is advantageous if the word corresponding to the specified word resulting in the cache miss is saved first. In this way, space is made within the cache memory circuit for the specified word to be fetched to and accordingly made available to the system, such as a central processing unit core, as soon as possible and in parallel with it being supplied to the cache memory circuit.

Following the initial cycle in which a single write operation to save an old cache word is made, on following cycles it is preferred that in subsequent steps following said cache miss, an old word to be replaced that has already been read from said cache row for storing to said main memory is replaced with a new word from said main memory written via said write bus at the same time as a further old word that has not yet been so is read from said cache row via said read bus for storing to said main memory.

In this way, the saving of the old words and the fetching of the new words can proceed contemporaneously and so the overall time taken to replace a cache row can be reduced.

As an alternative that simplifies the control logic while still yielding acceptable performance replacement of a cache row can take place working from one end to the other with the first word being read from the cache row being the first to be replaced and so on.

It has been found advantageous that the system should also include a write buffer in which old words being returned from said cache memory circuit to said main memory are held while new words are read from said main memory.

The provision of a write buffer allows the performance gains of the invention to be achieved with main memories having only a single access path (bus). The cache memory circuit of the invention is capable of simultaneously reading and writing words and the provision of a write buffer allows a memory capable of only a single access in any given cycle to satisfy all the read requests as quickly as possible without having to wait for the write requests to be completed in between.

The cache memory circuit of the invention may be separately formed, possibly of discrete components, but it is highly desirable to gain the maximum performance advantages that said cache memory circuit is a formed on an integrated circuit together with a central processing unit core.

Viewed from another aspect the present invention provides a method of operating a cache memory circuit, said method comprising the steps of:

(i) storing a plurality of words in each of a plurality of cache rows;

(ii) reading words from said cache memory circuit via a read bus coupled to said plurality of cache rows;

(iii) writing words to said cache memory circuit via a write bus coupled to said plurality of cache rows;

(iv) selecting with a row selector one of said plurality of cache rows as an active cache row;

(v) selecting with a read multiplexer a first word from said active cache row to generate an output word to a read bus;

(vi) selecting with a write multiplexer a second word from said active cache row to receive an input word from a write bus, said second word being different from said first word; and (vii) controlling with a multiplexer controller said read multiplexer and said write multiplexer such that said first word from said active row may be read via said read bus at the same time as said second word from said active row is written via said write bus.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 4:
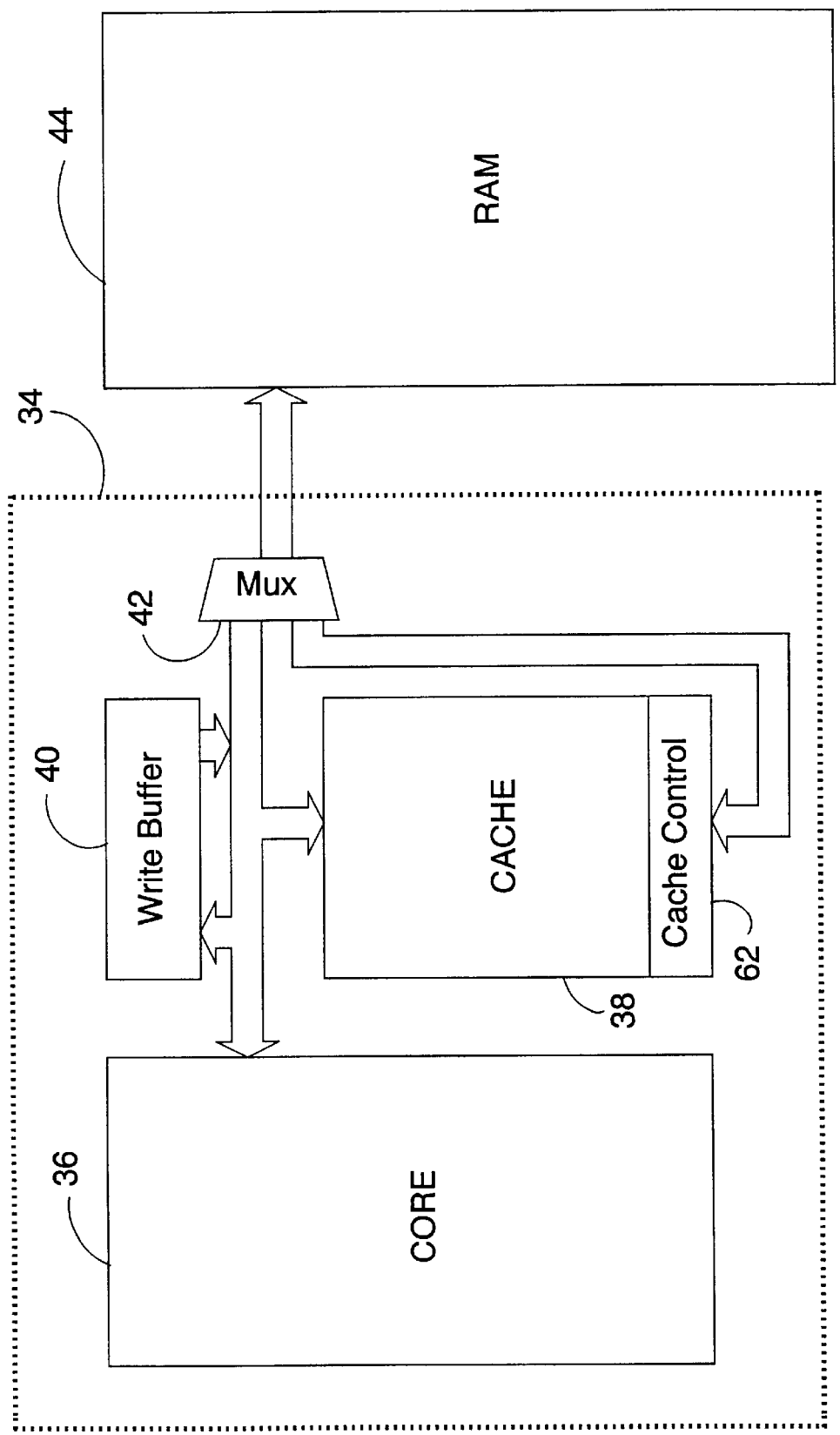
FIG. 4 schematically illustrates a data processing system incorporating a cache memory circuit modified in accordance with one embodiment of the invention.

FIG. 4 illustrates an integrated circuit 34 incorporating a central processing unit core 36, a cache memory circuit 38, a write buffer 40 and a multiplexer 42. A random access memory 44 is coupled to the various components of the integrated circuit 34 via the multiplexer 42.

Figure 5:
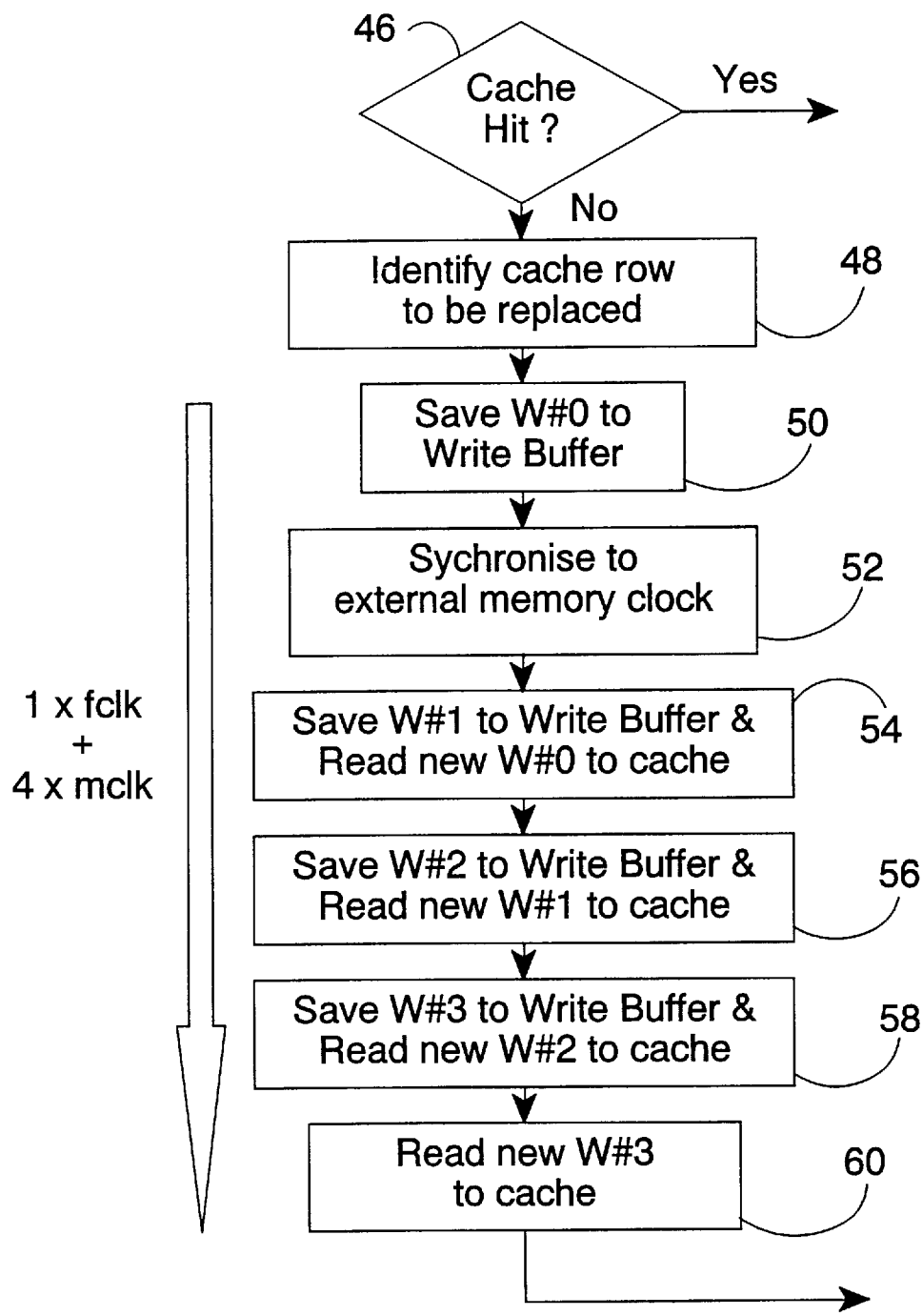
FIG. 5 illustrates the steps in the operation of the cache memory circuit of FIG. 4 when operating in a write back mode.

FIG. 5 illustrates the steps in the operation of the system of FIG. 4 when replacing a cache row. At step 46 a cache miss is detected. At step 48 the cache row to be replaced is identified in accordance with one of the known row replacement strategies. At step 50, the old word from the first location (W#0, in this case the specified word that resulted in the cache miss) is read from the cache memory circuit 38 via a read bus and stored within the write buffer 40. This operation takes one fast clock cycle (fclk) of the integrated circuit 32.

At step 52 the integrated circuit 32 changes its clock signal to synchronize with the clock signal of the random access memory 44 (mclk).

Following this synchronization, on the three next steps 54, 56 and 58, the next highest address old word is saved to the write buffer 40 whilst the word saved in the preceding stage is written to via a write bus with a new word taken from the random access memory 44 and passed through the multiplexer 42. The control of the multiplexer 42 and the cache memory circuit 38 is handled by the cache control logic 62.

In the final stage 60, all of the old words have already been saved to the write buffer 40 and only the last of the new words needs to be written into the cache row from the random access memory 44.

In this example, it will be seen that the words are saved and then written in the order #0, #1, #2 and #3. This is ascending address order within the random access memory. If the specified word had occurred midway within the cache row, as would typically be the case, then the order in which the saving and writing operations would take place would start from this specified word and ascend in address order with a wrap around to the beginning of the cache row, i.e. #0, when the end of the cache row, i.e. #3, was reached. Alternatively, the replacement could be made to always start at #0 and proceed through to #3.

The cache control logic 62 is responsive to the address of the specified word triggering the cache row replacement to control the sequencing of the saving of old words and the reading of new words to follow the above described order.

Figure 6:
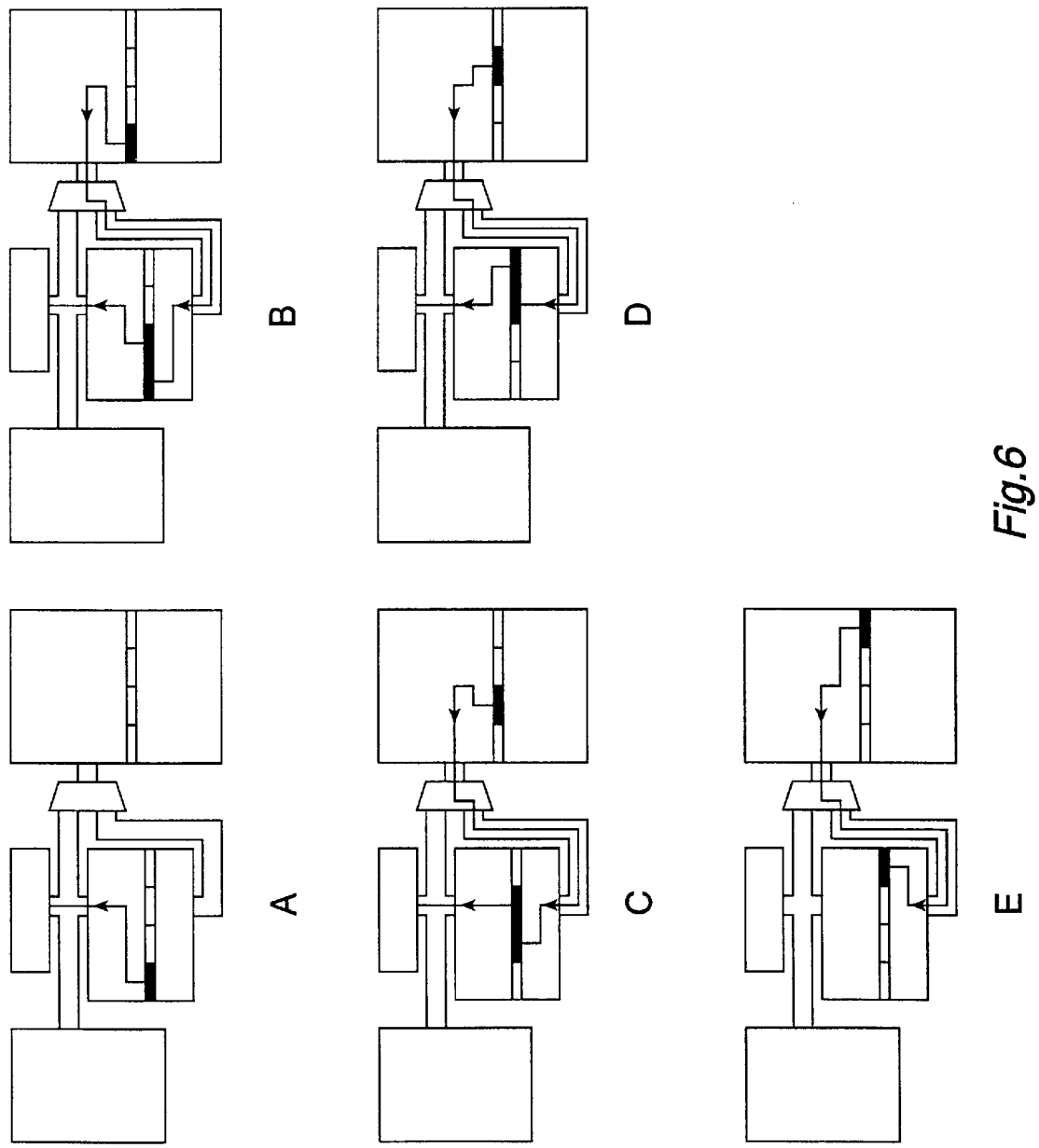
FIG. 6 illustrates the simultaneous read and write operations that occur to the cache memory circuit operating in accordance with the steps of FIG. 5.

FIG. 6 illustrates the reading and writing operations of the steps of FIG. 5.

Figure 1:
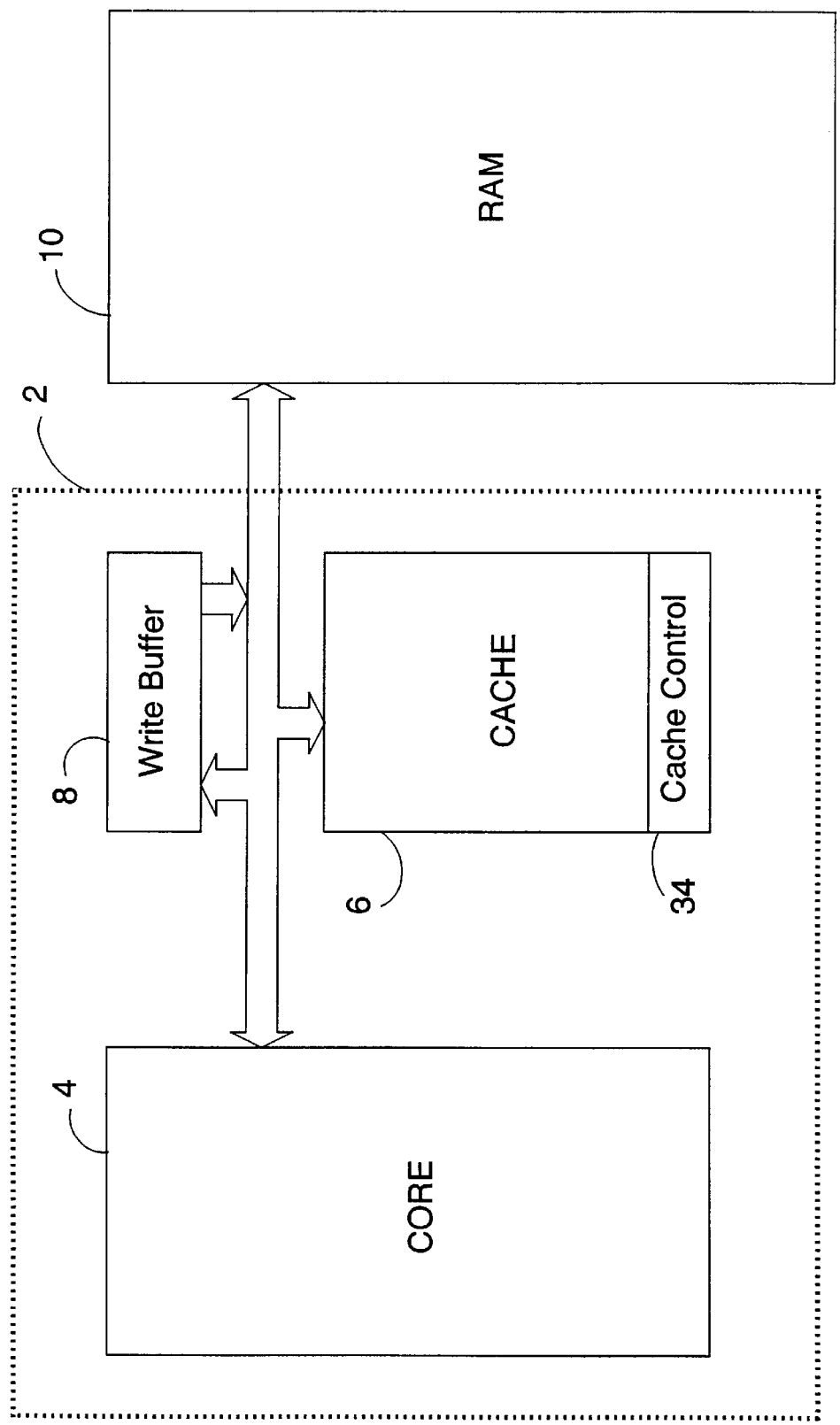
FIG. 1 schematically illustrates a data processing system incorporating a cache memory circuit.
Figure 2:
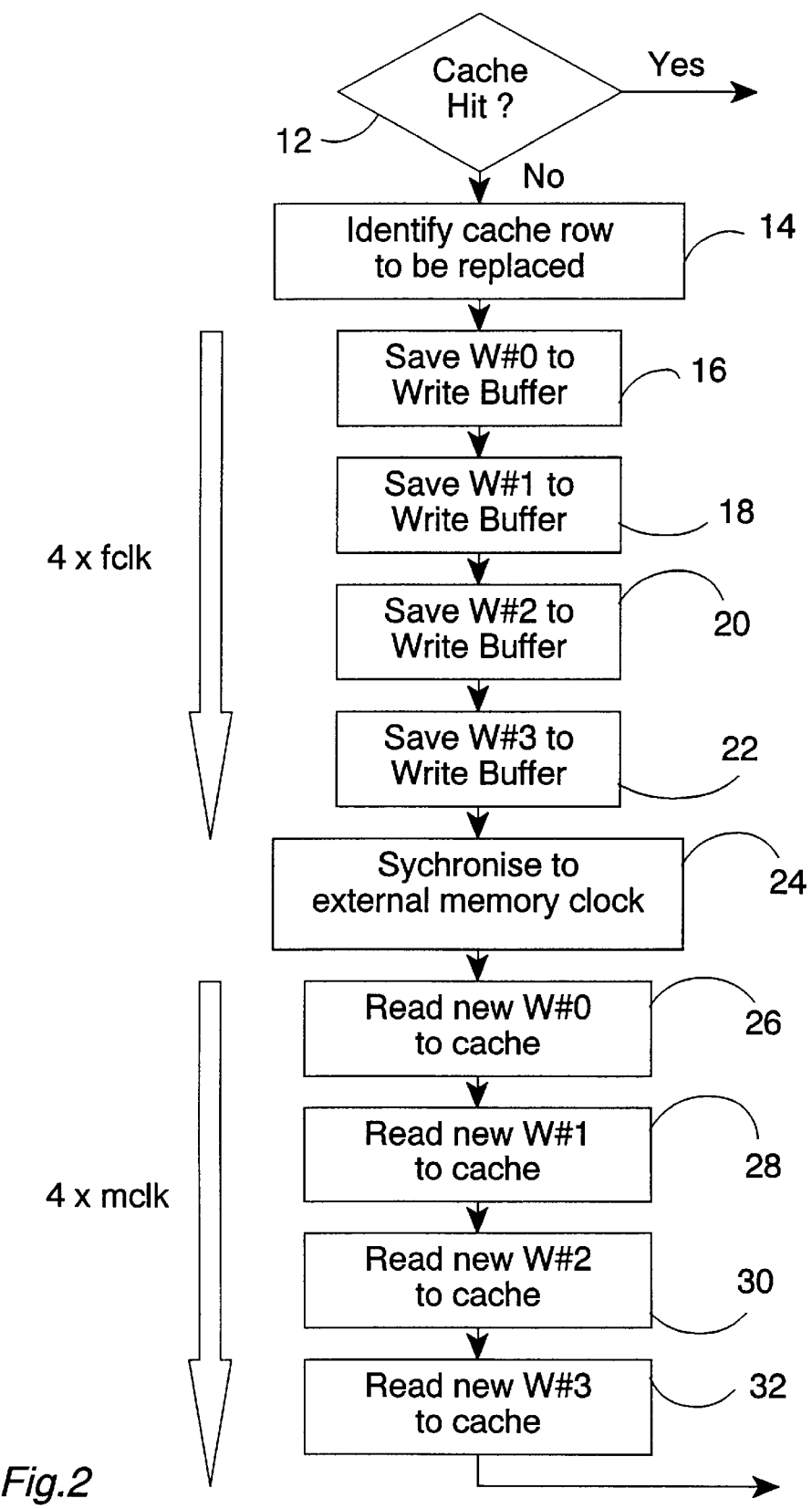
FIG. 2 illustrates the steps of the operation of the cache memory circuit of FIG. 1 when operating in a write back mode.
Figure 3:
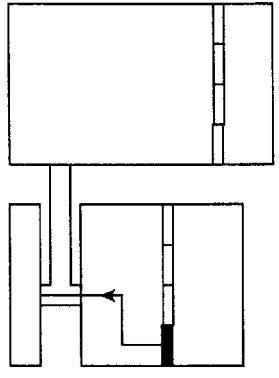
FIG. 3 illustrates the read and write operations in accordance with FIG. 2.
Figure 3:
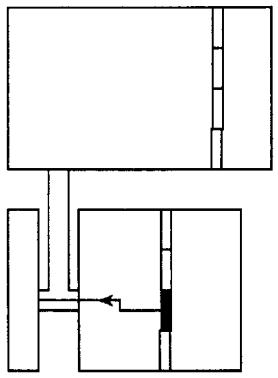
Figure 3:
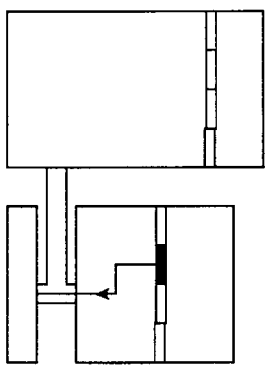
Figure 3:
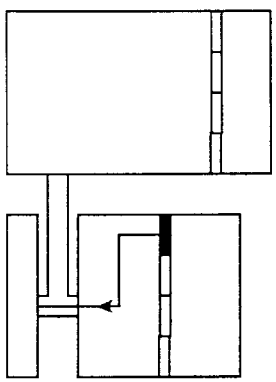
Figure 3:
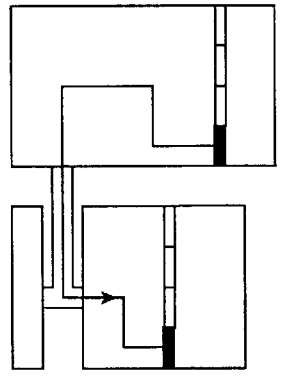
Figure 3:
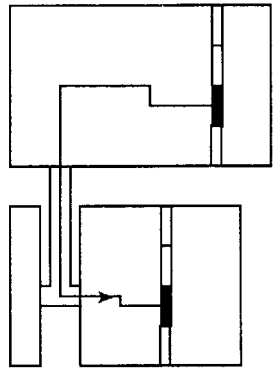
Figure 3:
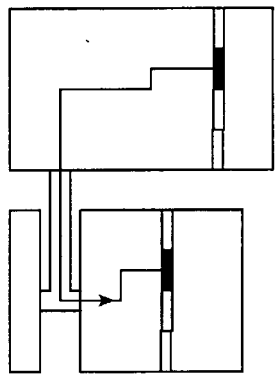
Figure 3:
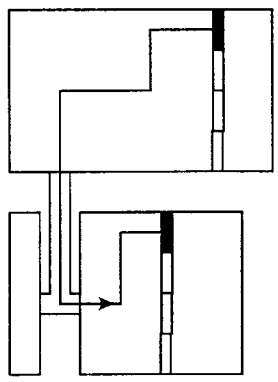

At step A, the first old word W#0 is saved to the write buffer 40. In the next step B, the new word W#0 is read from the random access memory at the same time as the next old word W#1 is saved to the write buffer 40. Steps C and D proceed in a similar way ascending in address order along the cache row. At step E only the final word needs to be written into the cache row from the random access memory 44. It will be seen that step A takes one fclk cycle while the step B to E take four mclk cycles. Comparing the time taken for the operations of FIG. 5 compared to those of FIG. 2, the time taken to replace a cache row is reduced by approximately 3×fclk. If a cache row is wider (e.g. containing more words), then the saving in time is greater.

Figure 7:
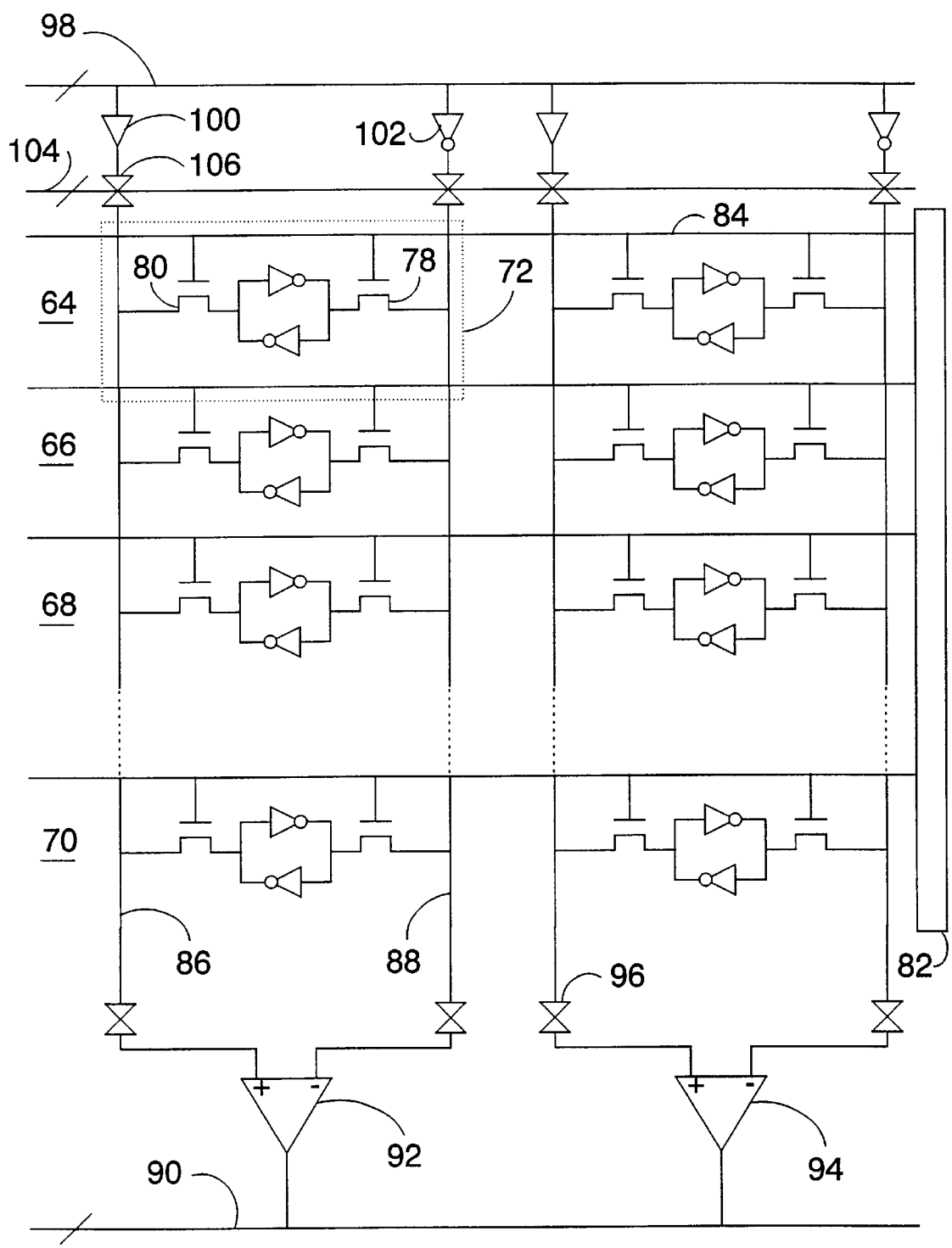
FIG. 7 illustrates a portion of the cache memory circuit of FIG. 4 in more detail.

FIG. 7 illustrates the cache memory circuit 38 of FIG. 4 in more detail. The cache memory circuit 38 includes a plurality of cache rows 64, 66, 68 and 70, only some of which are shown. Each cache row 64, 66, 68 and 70 contains a plurality of words, each made up of a plurality of bits. A storage cell for a single bit is illustrated within box 72. The storage cell contains two inverters 74, 76 together with two isolating transistors 78, 80. A row selector circuit 82 is responsive to the address specified for the word being accessed to switch on one of the cache rows by using one of the row selecting lines 84 to switch on the isolating transistors 78, 80 for that cache row while all of the isolating transistors 78, 80 for the other cache rows remain switched off.

When a given cache row is selected, then the bit it is storing is forced on to bit line 86 while the complement of the bit is forced onto bit line 88.

A read bus 90 is fed by the output of respective sense amplifiers 92, 94 that serve to accelerate the speed with which each particular bit is recognized from the signal values on the bit lines 86, 88. With appropriate multiplexing, one set of sense amplifiers may be made to serve all of the words within the cache row being replaced. A word selecting line for the read bus 90 acts with the gates 96 to perform the role of a read multiplexer whereby a particular one of the words stored within a cache row is selected for reading out via the read bus 90.

A write bus 98 is coupled via a buffer 100 and an inverter 102 for each bit to respective ones of the bit lines 86, 88. A write word selecting line 104 acting in conjunction with the gates 106 serves to select a particular word within a cache row to be written to via the write bus 98.

The overall operation of the circuit of FIG. 7 can be understood as the row selector switching on a particular one of the cache rows and then respective different words within that cache row being selected to be coupled to the read bus 90 and the write bus 98 for simultaneous reading and writing operations. In this way, improved cache performance, e.g. the time taken to replace the contents of a cache row, may be achieved.

Figure 8:
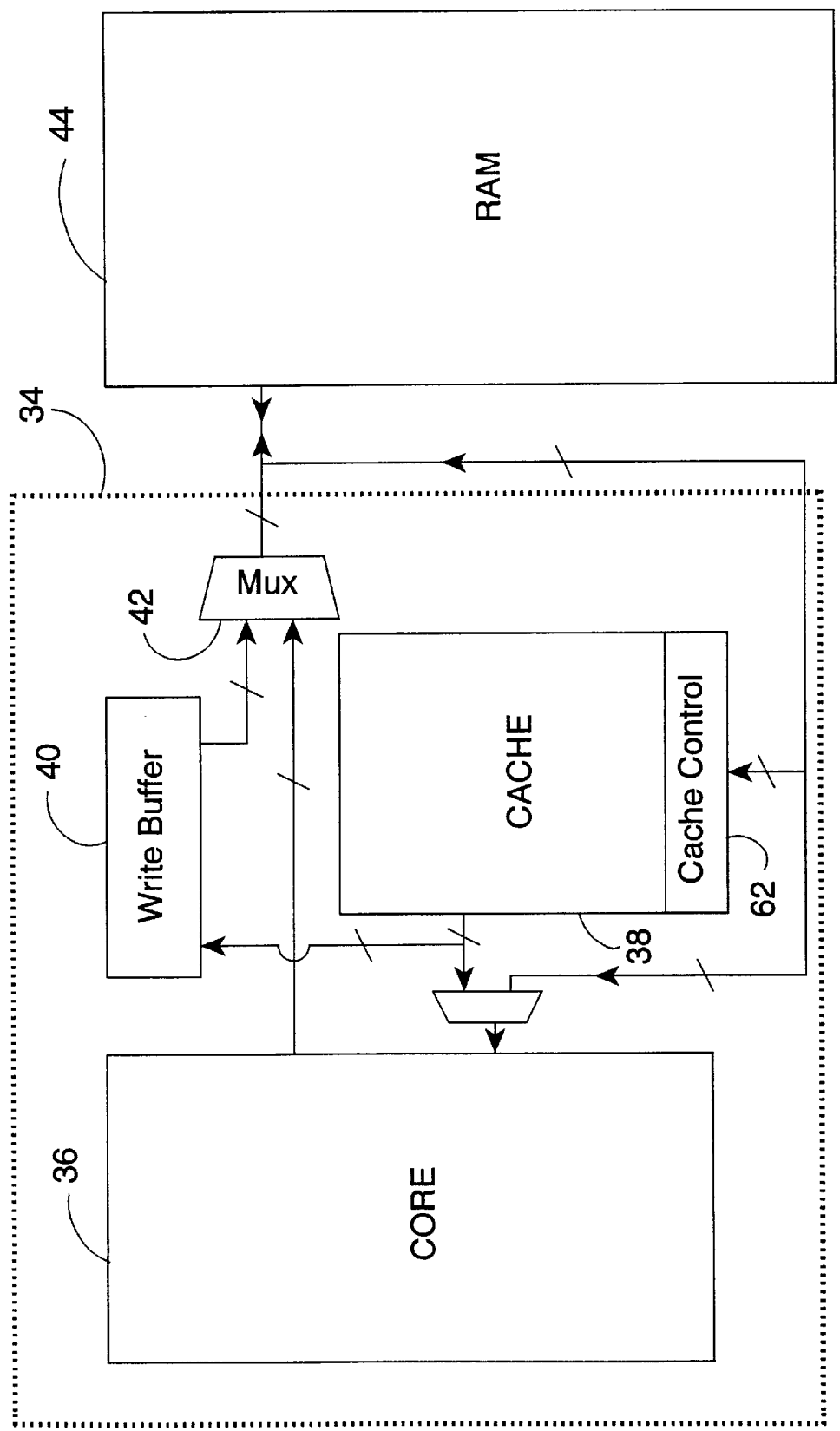
FIG. 8 illustrates an alternative bus structure to that of FIG. 4.

FIG. 8 illustrates an alternative bus structure to that of FIG. 4. In this structure direct paths are provided between the core 36 and the RAM 44 that may used when write buffering of caching are not required. This embodiment may also be operated such that all the words within a cache row that is being replaced may be stored to the write buffer 40 during the comparatively very slow first cycle needed to recover the first new word from the RAM 44.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A cache memory circuit comprising:
   (i) a plurality of cache rows, each cache row storing a plurality of words;
   (ii) a read bus coupled to said plurality of cache rows for reading words from said cache memory circuit;
   (iii) a write bus coupled to said plurality of cache rows for writing words to said cache memory circuit;
   (iv) a row selector for selecting one of said plurality of cache rows as an active cache row;
   (v) a read multiplexer for selecting a first word from said active cache row to generate an output word to a read bus;
   (vi) a write multiplexer for selecting a second word from said active cache row to receive an input word from a write bus, said second word being at a different location within said active row from said first word; and
   (vii) a multiplexer controller for controlling said read multiplexer and said write multiplexer such that said first word from said active row may be read via said read bus simultaneously with said second word from said active row being written via said write bus.

2. A cache memory circuit as claimed in claim 1, wherein said cache memory circuit includes cache control logic that operates said cache memory circuit as a write back cache to a main memory.

3. A cache memory circuit as claimed in claim 2, wherein, when a cache miss occurs for an access to a specified word, this triggers a plurality of old words stored within a cache row to be replaced with a plurality of new words from said main memory including said specified word.

4. A cache memory circuit as claimed in claim 3, wherein, in a first step following said cache miss, said old word stored within said cache row that will be replaced with said specified word is read from said cache row via said read bus for storing to said main memory.

5. A cache memory circuit as claimed in claim 4, wherein in subsequent steps following said cache miss, an old word to be replaced that has already been read from said cache row for storing to said main memory is replaced with a new word from said main memory written via said write bus at the same time as a further old word that has not yet been so is read from said cache row via said read bus for storing to said main memory.

6. A cache memory circuit as claimed in claim 3, wherein, in a first step following said cache miss, a first old word stored within said cache row is read from said cache row via said read bus for storing to said main memory.

7. A cache memory circuit as claimed in claim 6, wherein in subsequent steps following said cache miss, an old word to be replaced that has already been read from said cache row for storing to said main memory is replaced with a new word from said main memory written via said write bus at the same time as a further old word that has not yet been so is read from said cache row via said read bus for storing to said main memory.

8. A cache memory circuit as claimed in claim 2, comprising a write buffer in which old words being returned from said cache memory circuit to said main memory are held while new words are read from said main memory.

9. A cache memory circuit as claimed in claim 1, wherein said cache memory circuit is formed on an integrated circuit together with a central processing unit core.

10. A method of operating a cache memory circuit having a plurality of cache rows and including read and write buses coupled thereto and including a row selector and read and write and controller multiplexers, said method comprising the steps of:

(i) storing a plurality of words in each of the plurality of cache rows;

(ii) reading words from said cache memory circuit via the read bus coupled to said plurality of cache rows;

(iii) writing words to said cache memory circuit via the write bus coupled to said plurality of cache rows;

(iv) selecting with the row selector one of said plurality of cache rows as an active cache row;

(v) selecting with the read multiplexer a first word from said active cache row to generate an output word to the read bus;

(vi) selecting with the write multiplexer a second word from said active cache row to receive an input word from the write bus, said second word being at a different location within said active row from said first word; and (vii) controlling with the multiplexer controller said read multiplexer and said write multiplexer such that said first word from said active row may be read via said read bus simultaneously with said second word from said active row being written via said write bus.

* * * * *